April 19, 1955  R. M. BARNARD ET AL  2,706,682
METALLISING THE SURFACES OF CERAMIC BODIES
Filed Feb. 8, 1952

Inventor
R.M. BARNARD
S.E. BUCKLEY
By
Attorney

United States Patent Office 2,706,682
Patented Apr. 19, 1955

2,706,682
METALLISING THE SURFACES OF CERAMIC BODIES

Roy Mayne Barnard and Sidney Ernest Buckley, London, England, assignors to International Standard Electric Corporation, New York, N. Y.

Application February 8, 1952, Serial No. 270,702

Claims priority, application Great Britain February 9, 1951

1 Claim. (Cl. 75—206)

This invention relates to methods of metallising the surfaces of ceramic bodies.

It is well known to provide coatings of silver or other noble metals on the surfaces of ceramic bodies by applying them in a finely divided state, or as pastes, or in solution, and causing the coatings to adhere to the ceramic body by means of a flux which when heated forms a glaze on the surface of the body and carries the metallic coating.

Although the known processes are satisfactory in many cases they suffer from the disadvantages that the temperatures used in soldering leads or other metal bodies to the metallised surfaces of the ceramic body melt the blaze and also that the metals used in solder are commonly solvents for the metallised coating so that in consequence good conduction connections are not always obtained.

These disadvantages can be overcome if the surface of a ceramic body is metallised by applying a reducible metal oxide to the unglazed surface of the body forming a bond between the reducible oxide and the ceramic by heating or by pressing and heating, and subsequently reducing the metal oxide to the metallic state.

For example, in the case in which a ceramic body is formed by pressing and sintering powdered ceramic material, a metallic oxide such as copper oxide is used in powdered form and is added in those portions of the mould next to the surfaces of the finished body required to be metallised. The composite body is then compressed and sintered.

Preferably the copper oxide is compressed as a thin layer adhering to the ceramic body after the ceramic material has been pressed into shape. Thus finely divided ceramic material is first pressed into the shape desired, a thin layer of copper oxide is applied on the appropriate surface or surfaces thereof and united by pressure with the ceramic to form a composite unit which is then sintered in air at an appropriate temperature to form a hard ceramic body with the copper oxide firmly bonded to it. The copper oxide is then reduced to copper at a lower temperature than that used for sintering the ceramic, for example the reduction may be carried out in hydrogen at 600° C. The metallic surface thus formed can then be soldered with the same facility as sheet copper.

The copper oxide can be applied directly as copper oxide powder suspended in an adhesive medium such as a solution of cellulose acetate in acetone. The adhesive medium is burnt off when the body is heated.

Alternatively if preferred powdered metallic copper may be suspended in the adhesive medium and applied to the ceramic body. The copper is then oxidised to cupric oxide by heating the body in an oxidising atmosphere.

Yet a third method has been found satisfactory and to offer some advantages particularly when the surface to be metallised is flat. The ceramic body is stood on a flat plate with the surface to be metallised uppermost. A piece of thin copper foil say .001 inch thick is then placed on the surface to be metallised. The body is then slowly heated in air to a temperature of 1100° C. and maintained at this temperature for a period of from 40 to 60 minutes. The copper is oxidised to cupric oxide while the temperature is being raised and as the melting point of cupric oxide is 1064° C. the oxide finally melts and combines with the surface of the ceramic body. The body is then allowed to cool in air after which it is heated in an atmosphere of hydrogen to a temperature not less than 450° C. to reduce the cupric oxide to metallic copper which remains as a well bonded copper surface on the ceramic body.

It is believed that a portion of the metallic oxide after melting enters into the pores of the ceramic body and forms mixed oxide crystals with the ceramic material during the heat treatment and thus ensures the adhesion of the layer to the ceramic body.

Although the invention has been described in connection with the formation of a surface consisting of metallic copper it has also been found applicable to the formation of surfaces of silver, iron or nickel. Amongst suitable ceramic materials for carrying out the invention are kaolin, talc and titanium dioxide.

According to a feature of the present invention there is provided a method of applying an adherent surface layer of a metal chosen from the class containing silver, copper, iron and nickel to a ceramic body which comprises applying a layer of oxide of the said metal to the surface of the said ceramic body heating the body with said applied layer in a non-reducing atmosphere to a temperature above the melting point of said oxide, whereby the melted oxide flows into the surface of the ceramic body, and subsequently heating in a reducing atmosphere to reduce the surface of said oxide layer to form a metallic surface.

The invention finds particular application in the manufacture of terminal seals for electrical components, such as capacitors, transformers or the like that are required to be hermetically sealed in metal containers.

The application of the invention to the construction of a terminal suitable for sealing into a metal case such as that of a capacitor or transformer will now be described and illustrated in the accompanying drawing in which.

Figure 1:
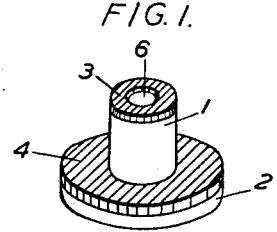
Fig. 1 shows a ceramic bush with two metallised surfaces.

In Fig. 1 there is shown a ceramic bush of which two surfaces have been metallised. The cylindrical portion 1 and the disc shaped portion 2 of the ceramic are integral with one another. The surfaces 3 and 4 are metallised by the method of the present invention. In the figure the thickness of the metal layer is exaggerated, in practice this layer is only a surface film which could not be separately shown.

Figure 2:
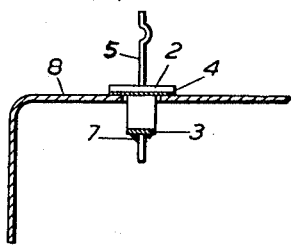
Fig. 2 shows how the metallised bush is fitted with a terminal tag and sealed into the case.

In Fig. 2 the terminal is shown completed and sealed into a metal case. A terminal tag 5 is passed through the central hole 6 in the ceramic bush and solder 7 is run around the tag and onto the metallised surface 3 thus making a complete seal. The cylindrical portion 1 of the ceramic bush is then passed through a hole in the metal case 8 until the disc shaped portion 2 with its metallised surface 4 rests on the outer surface of the case.

The surface 4 is carefully soldered to the outer surface of the metal case so as to complete the hermetic seal.

While the principles of the invention have been described above in connection with specific embodiments and particular modifications thereof, it is to be clearly understood that this description is made only by way of example and not as a limitation on the scope of the invention.

What we claim is:

Method of forming a ceramic body having at least part of the surface thereof coated with a firmly adherent coating of metal chosen from the class containing silver, copper, iron and nickel comprising the steps of sintering together powdered ceramic material from the group consisting of kaolin, talc and titanium dioxide and powdered oxide of said metal into a hard body with the metal oxide on at least part of the surface, heating said body to a temperature above the melting point of the said oxide to cause the said oxide to bond firmly to said ceramic and subsequently reducing the oxide to metal.

References Cited in the file of this patent

UNITED STATES PATENTS

| | | |
|---|---|---|
| 1,884,665 | Greiner | Oct. 25, 1932 |
| 2,035,015 | Schirmer | Mar. 24, 1936 |
| 2,551,712 | Soby | May 8, 1951 |

FOREIGN PATENTS

| | | |
|---|---|---|
| 4,880 | Great Britain of 1878 | Nov. 29, 1878 |